INVENTOR
RICHARD O. PROBST
CHARLES R. THATCHER
NORBERT M. ZUPAN

INVENTOR
RICHARD O. PROBST
CHARLES R. THATCHER
NORBERT M. ZUPAN

United States Patent Office 3,598,626
Patented Aug. 10, 1971

3,598,626
ELECTROSTATIC METHOD FOR COATING WITH POWDER AND WITHDRAWING UNDEPOSITED POWDER FOR REUSE
Richard O. Probst and Charles R. Thatcher, Indianapolis, and Norbert M. Zupan, Brownsburg, Ind., assignors to Ransburg Electro-Coating Corp., Indianapolis, Ind.
Application Jan. 5, 1966, Ser. No. 521,481, now Patent No. 3,439,649, which is a continuation-in-part of application Ser. No. 439,790, Mar. 15, 1965. Divided and this application Dec. 30, 1968, Ser. No. 798,563
Int. Cl. B05b 5/02; B44d 1/094
U.S. Cl. 117—17     8 Claims

ABSTRACT OF THE DISCLOSURE

A method for coating an article with powder includes directing one or more air-suspended powder sprays into a chamber through which the article is moved. The sprays are electrostatically deposited on the article. Undeposited powder is fluidized within the chamber and withdrawn in a fluidized state. The fluidized powder so withdrawn may be re-supplied to the sprays.

---

This is a division of application Ser. No. 521,481, filed Jan. 5, 1966, now U.S. Pat. No. 3,439,649 which is a continuation-in-part of our copending application Ser. No. 439,790, filed Mar. 15, 1965, and now abandoned.

This invention is concerned with coating articles with coating materials suspended in gas, such as a powder suspended in air, and more particularly with a method and apparatus for charging such coating material and discharging it into an electrostatic field for deposition on the article to be coated.

Certain materials, such as for example synthetic plastics, have desirable coating properties, but cannot advantageously be put into solution for application by normal spray equipment, paint brush, or other conventional means. Apparatus and processes have been developed for applying materials in powder form to articles. The powder particles may be fused by heat during or following application so that they bond together and to the article surface to form a solid coating thereon.

In one method heretofore practiced, the article to be coated is heated, and while in a heated state is passed through a chamber into which powder particles are blown at high velocities. The article is heated to or above the melting point of the coating material and is maintained at that elevated temperature while passing through the chamber so that the particles will, on contact with the article, adhere to the article and coalesce to form a coating thereon. Because the powder particles contact the article in only a happen-stance or random fashion, many of the particles injected into the chamber are exhausted through suitable exhaust stacks and must be either reclaimed for recycling through the chamber or discarded. If the particles are recycled through the chamber a number of times they become contaminated and must be discarded, thereby making this process relatively expensive. The happen-stance method by which the particles strike the article within the chamber requires that the article have a substantial dwell time within the chamber to insure the formation of a coating of the desired thickness, thereby further increasing the cost of the operation of said process.

This invention is concerned with a method and apparatus for electrostatic coating which overcomes these difficulties and disadvantages. One feature of the instant invention is that a coating powder is discharged in a directed manner onto the surface of the article to be coated. The particles are charged electrostatically and deposited on the article under the influence of an electrostatic field extending to the article. The article may be heated either prior to or subsequent to the deposition of the particles onto its surface so that said particles are fused and coalesce and can be set up into a uniform coating over the entire surface of the article. More specifically, it is a feature of the invention that the powder-air mixture is discharged from a plurality of spray guns disposed around and longitudinally spaced along the path of movement of the article with the electrostatic field extending between said guns and the article.

A further feature of the invention is that the spray guns are mounted on a cage through which the article passes with said cage being constructed in a manner such that the sprays discharged from the spray guns can be directed in the desired pattern onto the article irrespective of its cross-sectional shape.

Other objects and features of the invention will become apparent from the more detailed description which follows and from the accompanying drawings in which.

Figure 1:
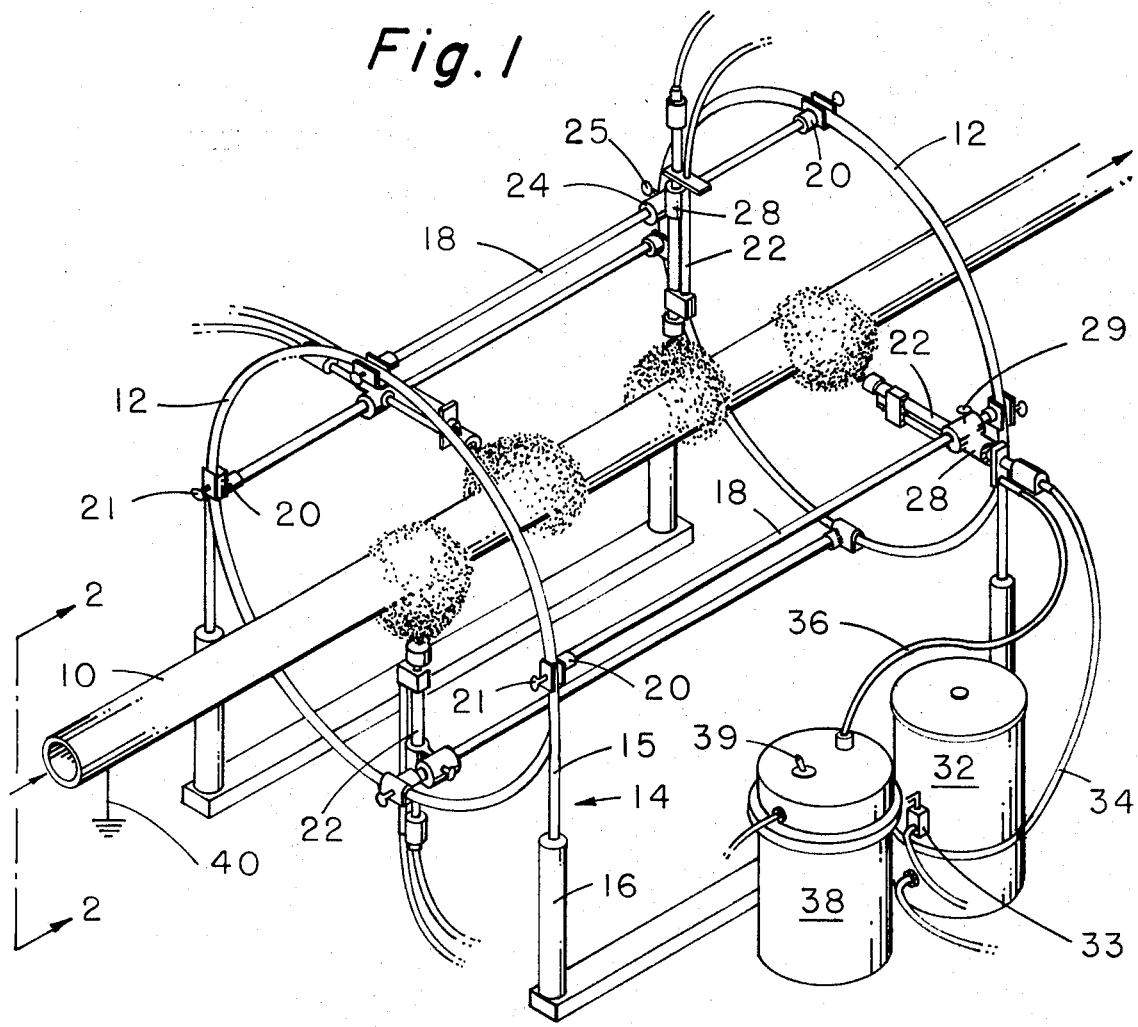
FIG. 1 is a perspective view of an apparatus embodying the invention.

Many materials, and particularly synthetic plastics, have characteristics, such as corrosion resistance, color, or dielectric strength which makes them desirable as coating materials. For example, epoxy resins and nylon can be applied to pipe used for handling corrosive materials, polyvinyl chloride powders can be used as coatings for protection and decoration of articles, and talc and similar powders can be used as coatings for lubricating and protecting materials such as rubber. The particular coating materials used will, of course, depend on the nature of the finish required and the conditions to which the article is to be subjected. Many of these materials cannot be placed in solution, but can be applied as powders, and it is the deposition of these powders to form coatings upon articles to which this invention is directed.

In general, the powders are prepared by grinding the bulk material, preferably at a low temperature. In practicing the instant invention, the powder particles are ground to form a particle size preferably in the range of 50 to 400 mesh, but may be coarser or smaller depending upon the particular material and its application.

This process is directed to the application of a coating of such powder materials onto an elongated article which can be moved in a continuous manner along a predetermined path through the sequence of processing steps. The article can be moved through the processing sequence without the necessity of rotating it about its longitudinal axis while still effecting a uniform coating of the desired thickness on its entire outer surface. The process can be used to coat any elongated article, such as pipes, beams, channels, strip material and the like, but for ease of description the article to be coated in the apparatus shown in FIGS. 1–5 will be described herein as a pipe.

The pipe to be coated is cleaned to insure adhesion of the powder particles to its surface. After such cleaning, the pipe is heated to a temperature above the melting point of the powder but below its decomposition temperature, and while said pipe is in a heated state, the coating powder is applied to its surface. After the coating has been applied, the pipe is cooled to cause the powder to set up into a continuous film over its circumference. Alternatively, the coating step can precede the heating step. However, in such a sequence, care must be exercised to insure that the powder particles applied to the pipe are not rubbed off, such as by mechanical abrasion by a conveyor or article-supporting mechanism, before the pipe with the powder particles thereon is subjected to a heating step which will cause the powder particles to fuse and coalesce over the surface of said pipe.

In order to assure a uniform bond between the coating material and the entire circumference of the pipe, said pipe must be clean at the time the coating material is applied thereto. Therefore, if the pipe is not clean prior to the coating step, it is subjected to a cleaning step which may be accomplished in any desired manner, such as by an abrasion wheel, a shot blast, chemical treatment, etc. Following the cleaning step, if the pipe is to be heated prior to the application of the coating material, it is heated in any convenient manner, such as by an oven, to raise its temperature sufficiently such that when the coating material is applied to its outer surface, said surface, as well as the coating material applied thereto, will be at a temperature above the melting point of the coating material but below its decomposition temperature. Such temperatures will, of course, vary with the material being employed. If the heating step is carried out subsequent to the application of the coating material, the pipe and the coating material are heated to a temperature above the melting point of the coating material but below its decomposition temperature.

After the coating material has been applied to the pipe and has been fused and coalesced thereover, either by heating prior to or subsequent to coating application, the coating material and pipe are cooled to a temperature sufficient to set the coating into a self-sustaining state having a uniform thickness over the entire pipe circumference. Such cooling can be effected in any convenient manner, such as by a chilled air blast, a water rinse etc.

As illustrated in FIG. 1, the pipe 10 which is to be coated is moved continuously through a coating apparatus comprising a cage formed from a pair of longitudinally spaced annular members 12 conveniently having a circular form. The members 12 give the cage an open-ended construction so that the pipe 10 can be passed therethrough. Each of the members 12 is supported on a pair of downwardly projecting legs 14, each of which has an upper portion 15 rigidly connected to its associated member 12 and threadably received in a ground-engaging lower portion 16. In this manner, the over-all length of the legs 14 can be adjusted by adjusting the portion 16 on the portion 15 to thus dispose the longitudinal axis of the cage at different heights from the floor so that said cage can be centered around pipes and other articles of different cross-sectional extents without changing or adjusting the supporting structure or other conveyor means upon which the pipes and articles are supported and carried. The members 12 are interconnected by a plurality of longitudinally extending struts 18. Each of said struts has a pair of C-clamps 20 at its ends received around the members 12. The set screws 21 on the clamps 20 can be tightened for releasably locking each of the struts in the desired angular relationship on the members 12.

A plurality of spray guns 22 are mounted on the members 12 and/or struts 18 for directing sprays 30 of the coating material onto the pipe 10. Each of the guns is mounted for substantially universal movement with respect to the cage, and to this end each of the spray guns is carried on a mount comprising a sleeve 24 provided with a set screw 25 for releasably locking the sleeve in the desired angular and longitudinal position along the length of one of the struts 18. A second sleeve 28 is connected to the sleeve 24 with its axis normal to the axis of the sleeve 24. Each spray gun 22 is slidably carried in the sleeve 28, and said sleeve is provided with a set screw 29 engageable with the gun 22 for releasably locking said gun in the desired position with respect to said sleeve and the pipe. While the sleeves 24 shown in FIG. 1 are illustrated as having rectilinear axes for mounting on the struts 18, it is to be understood, that said sleeves can have arcuate axes for thus mounting the spray guns on the members 12.

The spray guns 22 are mounted on the strut 18 and/or members 12 to project inwardly into the cage for directing the coating material onto the pipe 10. Desirably, said spray guns are mounted on the cage in longitudinally spaced relationship and are angularly disposed around said cage so that they will form an aggregate spray pattern completely enveloping the outer surface of the pipe 10 with the axis of each spray substantially normal to the pipe axis.

The coating powder is suspended in air in a reservoir 32 provided with a metering control valve 33 and is carried to each of the guns through a conduit 34. The air, which serves as the pressure source for carrying the powder through the conduits 34 and spraying it outwardly from the guns, is delivered from the guns at a rate in the order of 3 c.f.m. so that the air surrounding the pipe 10 within the cage is in a relative quiescent state. Each of the guns 22 is electrically connected as by a cable 36 to a high voltage D.C. power supply 38 provided with a control switch 39. As indicated in the illustrated embodiment, each gun 22 is provided with its own reservoir 32 and power supply 38 to permit each gun to be individually controllable. In this manner, any combination of the spray guns 22 can be actuated for controlling the aggregate spray pattern developed by the guns to thus facilitate shaping the spray pattern to the cross-sectional configuration of the article to be coated and to control the thickness of the coating applied to the article. The guns can be supplied from a common reservoir and individually controlled by using metering control valves for each gun. Where individual control is not desired, all of the guns can be connected to a common power supply.

Figure 2:
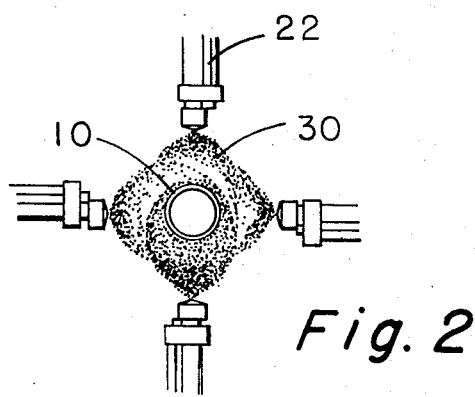
FIG. 2 is a fragmentary vertical section taken on the line 2—2 of FIG. 1.

The voltage applied is preferably negative and provides an average voltage gradient between the discharge end of the guns and the pipe of at least 5 kilovolts per inch. The pipe 10 is grounded, as at 40, and the powder particles discharged from the guns 22 acquire an electrostatic charge and discharge into the electrostatic field extending between the guns and the pipe 10, and are thus attracted and deposited onto said pipe. As shown in FIG. 2, the sprays 30 are directed onto the pipe 10, and under the action of the electrostatic forces, they will wrap around the face of the pipe remote from their respective guns whereby each of said guns will cause its associated spray to come in contact with the entire circumference of the pipe 10. To insure a complete and uniform coating of the entire circumference of the pipe, the guns 22 are angularly disposed about the cage 12 so that their sprays 30 are directed to different arcuate segments of the pipe circumference. To this end, it is desirable to mount the guns on the cage in a helical orientation.

Figure 3:
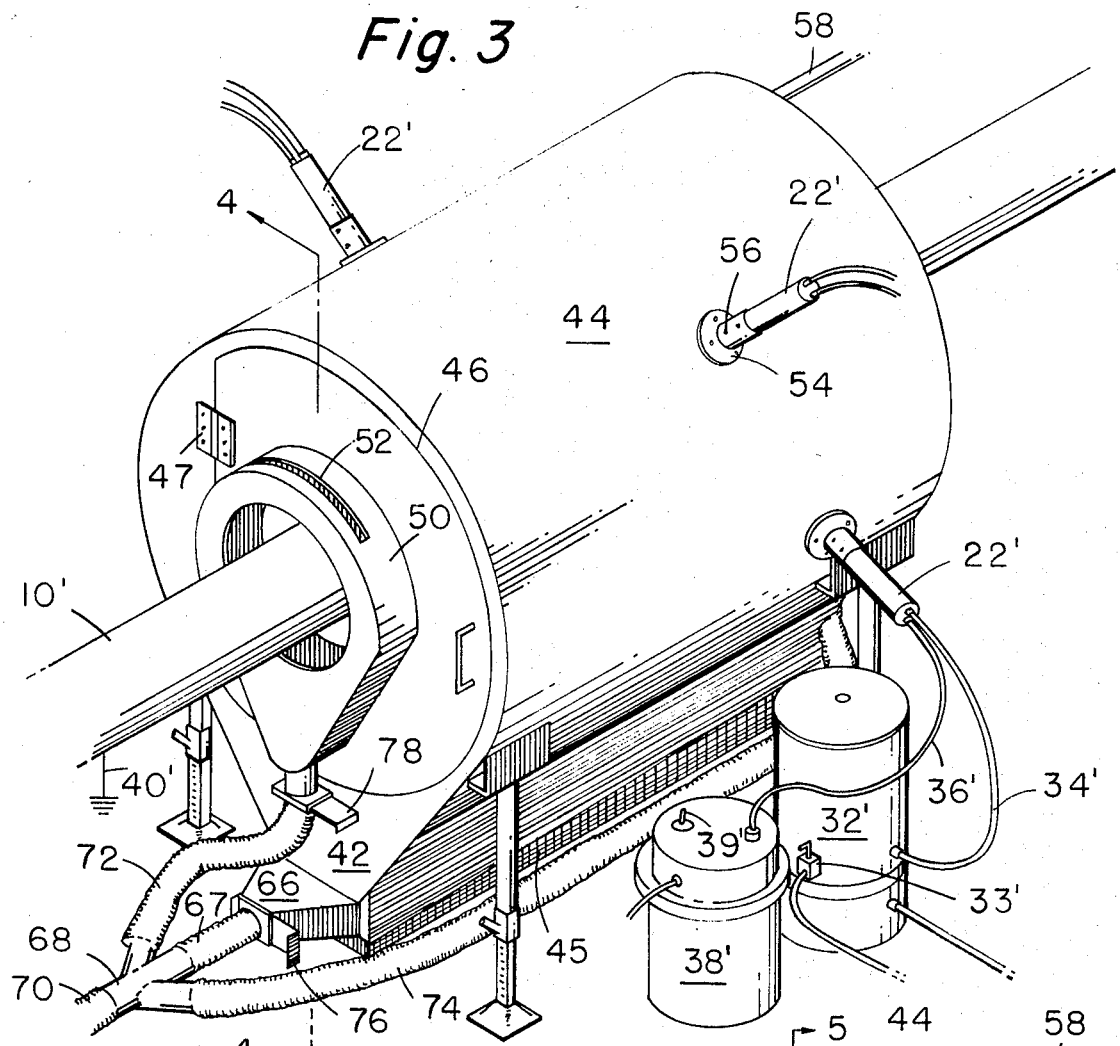
FIG. 3 is a perspective view of a modified form of the apparatus shown in FIG. 1.
Figures 4, 5:
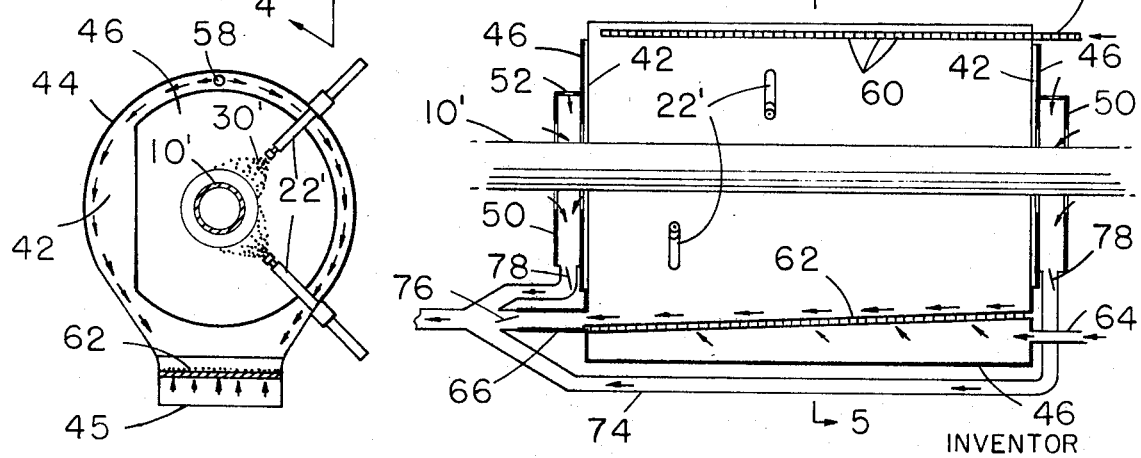
FIG. 4 is a vertical section taken on the line 4—4 of FIG. 3.
FIG. 5 is a vertical section taken on the line 5—5 of FIG. 4.

In the apparatus shown in FIGS. 3–5, the pipe 10', which is grounded at 40', passes through an open ended cage in the form of a housing having a pair of end walls 42 interconnected by a side wall 44 and base 45. Conveniently, one or both of the end walls 42 has an enlarged access opening formed therein which is closed by a door 46 hinged to the wall at 47 and maintained in closed position by a spring (not shown). The door 46 and the opposite end wall 42 have aligned openings for passage of the pipe through the cage. For reasons that will become more apparent hereafter, each of said openings is bordered by an inwardly open channelled cowling 50 having a damper 52 in its upper end.

A plurality of sleeved plates 54 are mounted in a plurality of longitudinally and angularly spaced openings formed in the housing wall 44. Desirably, said openings and end plates are disposed in a helical pattern along the length of the cage. A spray gun 22' is slidably carried in each plate 54 with the axis of its spray 30' substantially normal to the pipe axis. Each of the spray guns is releasably retained at the desired distance from the pipe by a set screw 56 carried in its associated plate 54. As with the apparatus shown in FIG. 1, the aggregate pattern of the spray 30' will completely envelope the outer surface of the pipe.

The coating powder is suepended in air in a reservoir 32' provided with a metering control valve 33' and is carried to each of the guns through a conduit 34'. And each of the guns 22' is electrically connected as by a cable 36' to a high voltage D.C. power supply 38' provided with a control switch 39'. As stated before, each gun 22' is shown provided with its own reservoir 32' and power supply 38' to permit each gun to be individually controllable although separate reservoirs are not necessary for individual controllability. Alternatively, all of the guns can be connected to a common power supply where such individual controllability is not desired.

Although substantially all of the powder in the spray 30' is attracted to and deposited on the pipe by the action of the electrostatic forces, a small amount of said powder will not be deposited. To reclaim the nondeposited powder particles an air tube 58 connected to a suitable source of air under pressure extends along the top of the wall 44 in the cage. Said tube has pluralities of openings 60 for directing streams of air upwardly, outwardly and downwardly around the curved inner face of the housing as shown by the arrows in FIG. 5. With the air moving along the inner face of the housing, the air surrounding the pipe 10' will still remain in a relative quiescent state. The nondeposited particles fall upon an inclined floor 62 formed from an air permeable material. A second air tube 64 also connected to a suitable source of air under pressure is mounted in the base 45 below the floor 62 and forces air upwardly through said floor to cause the particles on the floor to flow downwardly along said floor.

A collector 66 is mounted in the base 45 at the lower end of the floor 62 and is connected by a conduit 67 to a manifold 68 connected by conduit 70 to a vacuum source. In this manner, the nondeposited particles moving along the floor 62 will pass through the collector 66 and conduits 67 and 70 so that they can be collected for reuse. Conduits 72 and 74 are also connected to the manifold 68 and to the lower ends of the cowlings 50 for pulling air into said cowlings through the openings and dampers therein to thus provide air curtains at the ends of the housing for preventing any nondeposited particles from escaping through the openings at the ends of the housing. Conveniently, valves 76 and 78 are mounted in the collector 67 and cowlings 50, respectively, to control the flow of air and powder particles through the conduits 67, 72, and 74.

In the apparatus shown in FIGS. 6–9, the grounded work 80 to be coated passes through an open ended cage in the form of a housing provided with hingedly interconnected upper and lower shells 82 and 84. The lower shell 84, which is supported on a ground engaging base 85, is formed from a pair of longitudinally spaced end walls 86 interconnected by side walls 87.

Figure 7:
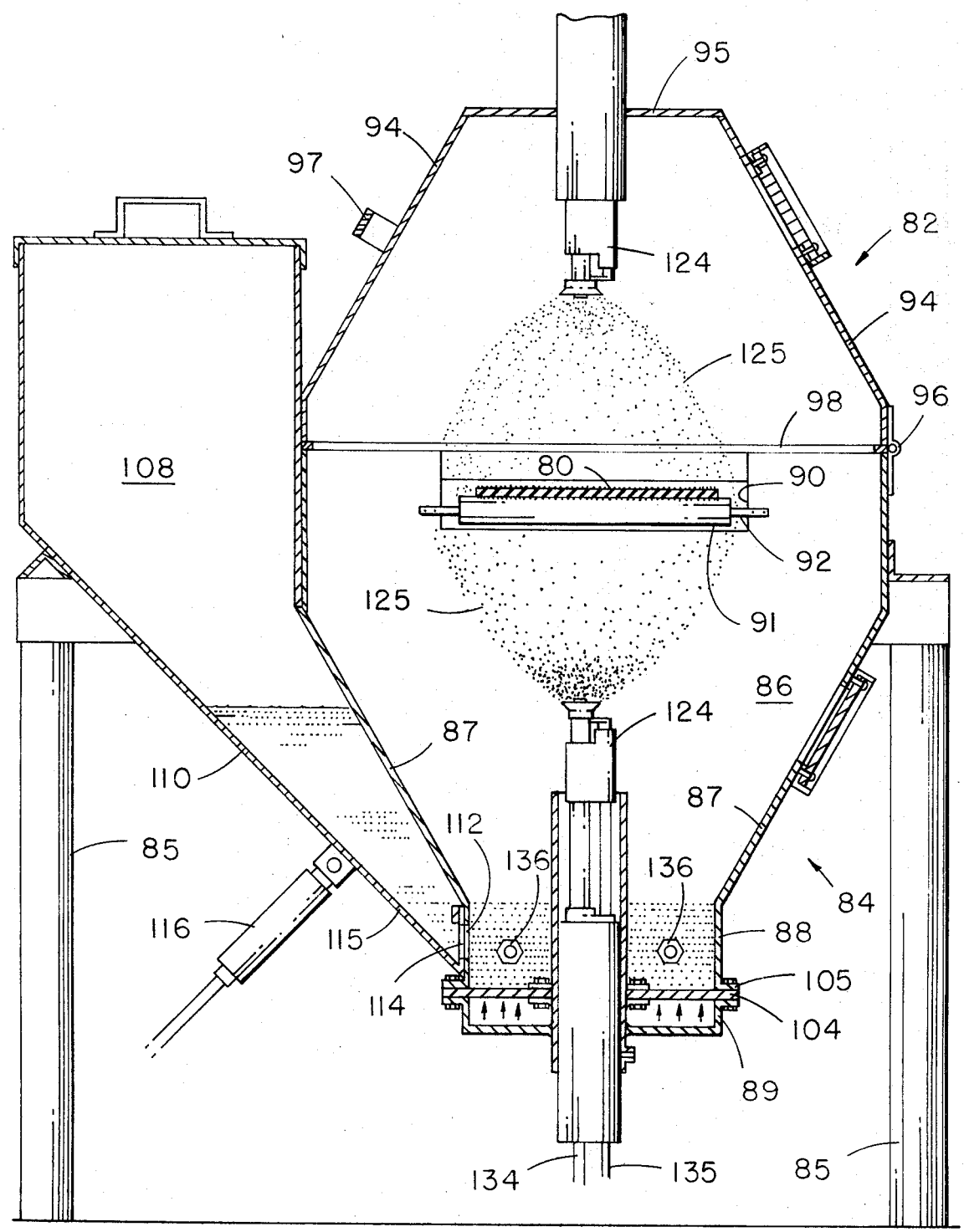
FIG. 7 is a vertical section taken on the line 7—7 of FIG. 6.

As shown in FIG. 7 side walls taper inwardly intermediate their heights and terminate at their lower ends in a downwardly projecting reservoir 88 having a bottom wall 89. Aligned openings 90 are formed in the upper edges of the end walls 86 and rollers 91 formed from nylon or any other suitable non-conductive material carried on axles 92 mounted on the end walls are disposed along the lower edges of said openings to support the work 80 as it is moved through the cage.

The upper shell 82 comprises a pair of end walls 93 interconnected by tapered side walls 94 joined at their upper ends by a top wall 95. The side walls 87 and 94 are interconnected at one end of the cage by a pair of hinges 96 for swingably mounting the shell 82 on the shell 84. A handle 97 is mounted on the shell 82 to facilitate moving it to and from its closed position overlying the shell 84. With the shell 82 in its closed position, its walls 93 and 94 rest upon a gasket 98 mounted on the upper edges of the walls 86 and 87 so that the housing is completely closed except for the openings 90. Conveniently, in order to observe the coating process, windows 100 can be mounted on the shells 82 and 84.

An air permeable plate 104 is supported in the reservoir 88 above its bottom wall 89, as by flanges 105 formed in the end and side walls 86 and 87. The powder to be deposited is stored in a hopper 108 mounted at one end of the housing and provided with a discharge chute 110 terminating in an opening 112 formed in the adjacent side wall 87. Desirably, a gate 114 is slidably mounted in a guide 115 on said side wall for adjusting the size of the opening 112 to regulate the flow of the powder into the reservoir 88. Conveniently, an air-actuated vibrator 116 is mounted on the chute 110 adjacent its discharge end to prevent damming of the powder in the chute. A stream of air is introduced into said reservoir between the plate 104 and bottom wall 89 through conduit 120 (FIG. 6) fitted with a control valve 121. The air flows upwardly through the plate 104 to maintain the powder in a fluidized state within the reservoir.

A pair of spray guns 124 are mounted on the cage to discharge sprays 125 of the powder onto the work 80, the axes of said sprays being normal to the work. One of said spray guns is mounted in the top wall 95 and projects downwardly into the shell 82 to discharge its spray 125 onto the top of the work. The second spray gun projects upwardly through the reservoir bottom wall 89 and the plate 104 for directing its spray 125 toward the underside of the work. As with the apparatus shown in FIGS. 1 and 3, the aggregate pattern of the sprays 125 will completely envelope the outer surface of the work with the air within the housing remaining in a relatively quiescent state.

Figure 6:
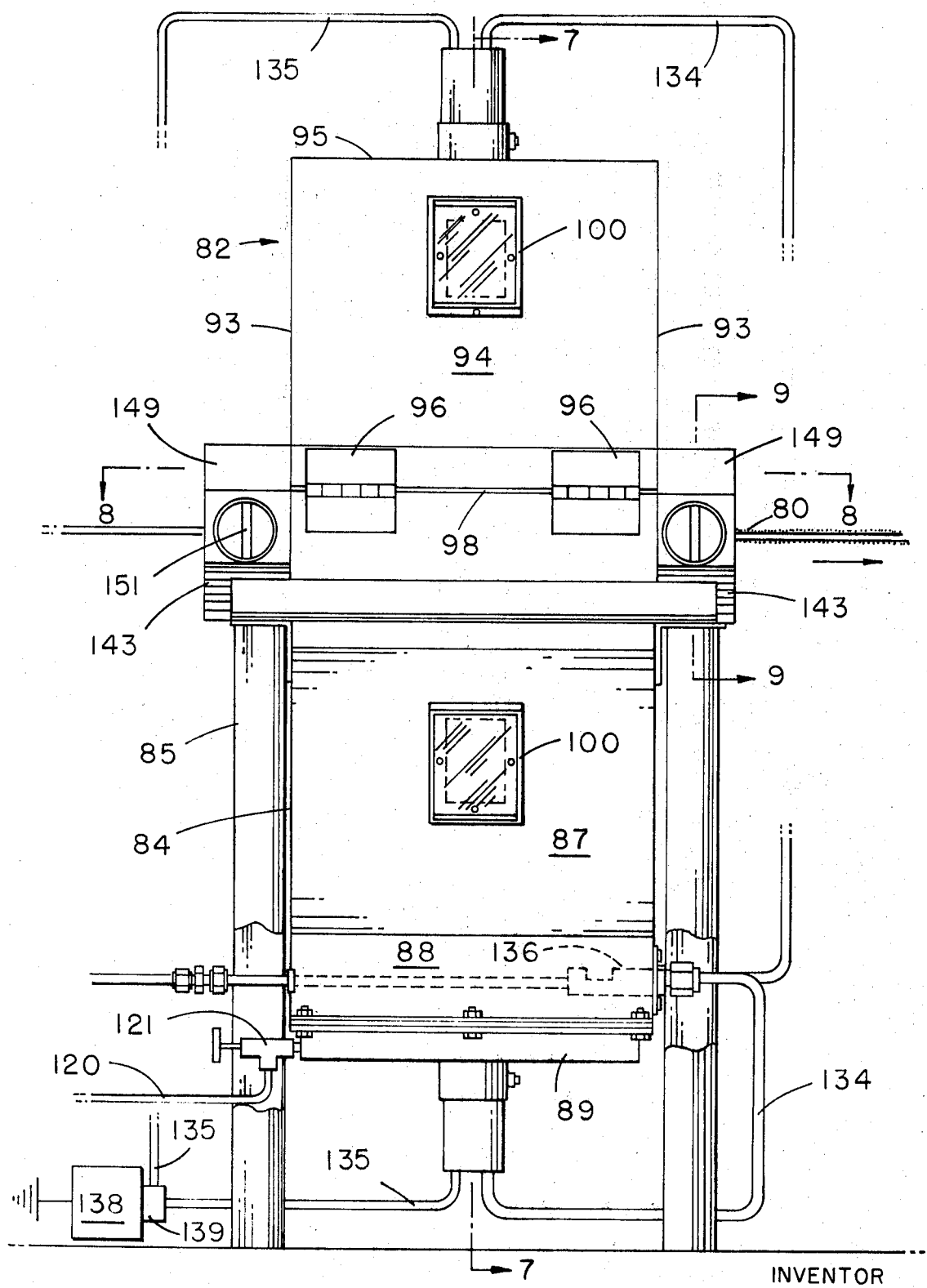
FIG. 6 is an end elevation of another modified form of the apparatus.

As shown in FIG. 6 the fluidized powder in the reservoir 88 is carried to each of the spray guns 124 through conduits 134. As shown, one end of each of the conduits is connected to one of the spray guns, and its opposite end is connected to a pump 136 mounted in one of the side walls 87 to project into the fluidized coating material in the reservoir. Each of the guns 124 is also electrically connected by a cable 135 to a high voltage D.C. power supply 138 provided with a control switch 139. With each of the guns having its own powder supply and power supply, said guns will be individually controllable. Alternatively, the guns can be connected to common power and powder supplies where such individual controllability is not desired.

Figure 8:
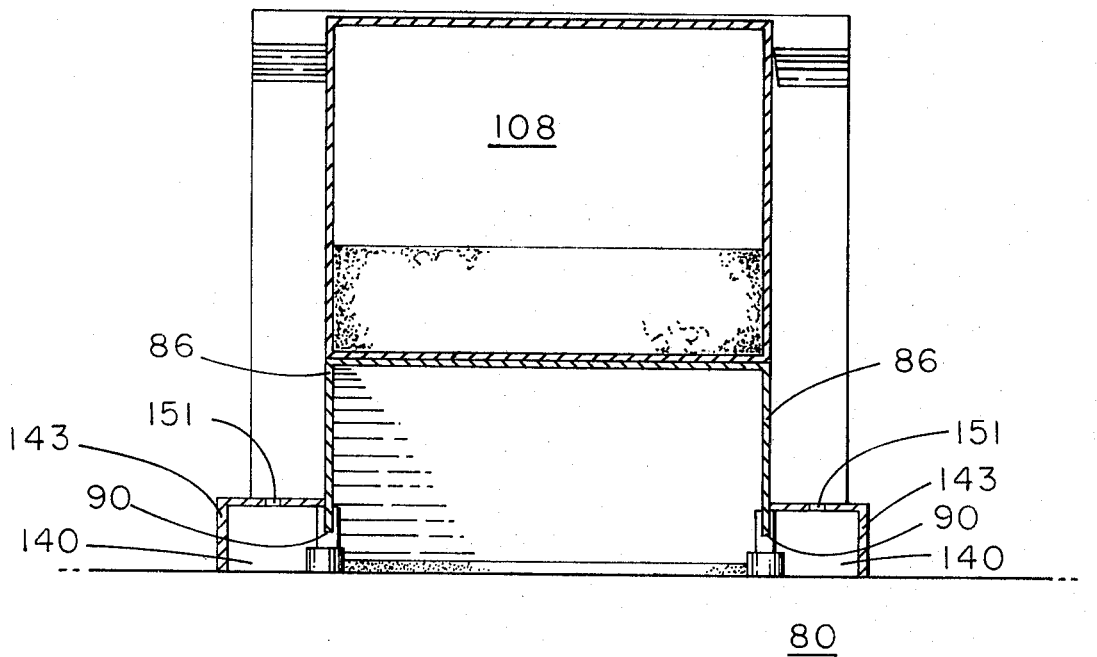
FIG. 8 is a horizontal section taken on the line 8—8 of FIG. 6.
Figure 8:
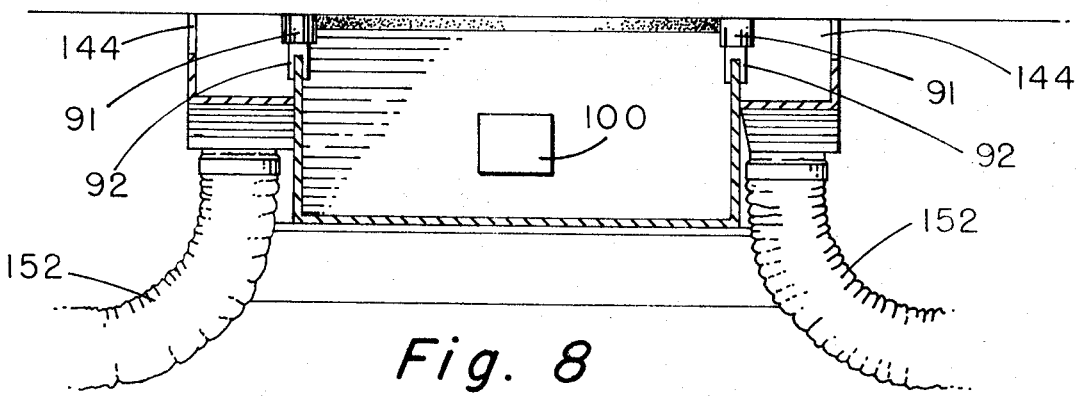
Figure 9:
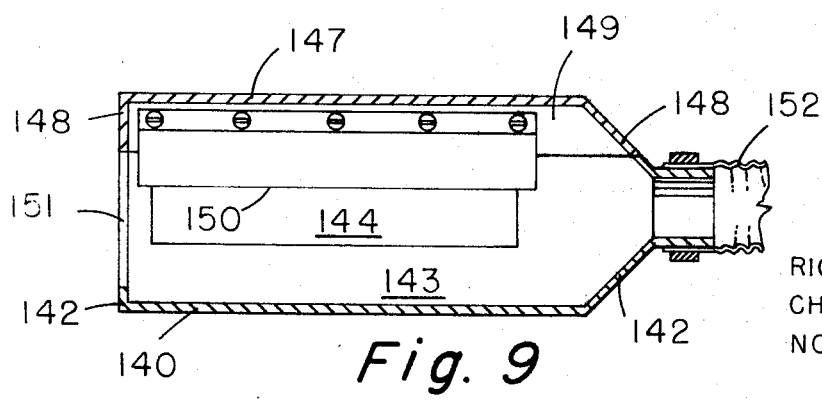
FIG. 9 is a horizontal section taken on the line 9—9 of FIG. 6.

Although substantially all of the sprayed powder is attracted to and deposited on the work by the action of electrostatic forces, a small amount of powder will not be deposited and will drop back into the reservoir or move toward the housing openings 90. To prevent the undeposited powder from being discharged to the atmosphere through the openings 90, cowlings are mounted on the end walls 86 and 93 at each of said openings. As shown in FIGS. 8 and 9, each of said cowlings has a lower portion comprising a generally U-shaped trough having a web 140 forming the bottom cowling wall interconnecting a pair of upwardly projecting legs 142 forming the lower portions of the cowling and walls. The inner edges of said web and legs are connected to the wall 86, and their outer edges are connected to an outer wall 143 provided with a generally rectangular opening 144. The upper portion of said cowling comprises a cover having a web 147 forming the cowling top wall and interconnecting a pair of legs 148 forming the upper portions of the cowling end walls. Said web and legs have their inner edges connected to the end wall 93 and their outer edges connected to an outer wall 149. Conveniently, a curtain 150 is mounted on the outer wall 149 and projects downwardly therefrom to cover a portion of the opening 144 when the upper shell 82 is moved into its closed position. A vertically extending opening 151 is formed in one of the cowling legs 142, and the opposite leg 142 is connected to a conduit 152 connected to a suitable vacuum source. In this manner, any undeposited powder particles within the housing that do not fall back into the reservoir 88 will be exhausted through the cowlings and conduits 152 to be collected for reuse. The negative pressure within the cowlings further serves to prevent foreign particles from entering the housing for deposition onto the work.

The coating thickness applied to the article can vary over a wide range, as from a fraction of a mil to 50 mils depending upon the characteristics of the powder employed. The minimum and maximum thicknesses of the coating are determined by the flow characteristics of the powder. The coating thickness, within the minimum and maximum limits defined by the coating material itself, can be controlled by the speed at which the article moves through the deposition cage, the total rate of delivery of the spray guns employed, and the voltage applied to the guns. In the coating operation, the charged particles are attracted by the grounded article and are held on said article by an electrostatic attraction and by their mutual fusing and coalescene. As the coating becomes thicker, the particles retain their electrical charge and repel the accumulation of additional particles until the article has passed out of the deposition cage or, in the case of a heated article, until the build up of the coating has reached a point where the particles will sag and drip in their fused state, the rate being determined by the characteristics of the powder as previously explained.

The following examples are illustrative of the invention.

EXAMPLE 1

A three inch pipe formed of cold rolled steel was cleaned by a shot blast and fed through an oven. The pipe left the oven and was fed at the rate of 60 feet per minute through a cage containing four spray guns mounted on said cage with the axes of the sprays equally angularly spaced around said pipe and the guns discharge heads spaced three inches from the pipe. Powdered epoxy resin (Minnesota Mining and Manufacturing Co. EC 101), 100 mesh, suspended in air, was sprayed from the guns at the rate of 36 pounds of powder/hour/gun. The voltage at the power supply was approximately 90 kilovolts, and the voltage at the discharge ends of the guns was 40 kilovolts. Because of its prior heating, the pipe had a temperature of about 475° F. during its passage through the cage. Following spraying, the coated pipe was quenched with a water spray at a temperature of between 60° F. and 70° F. to set the plastic. An epoxy film of about 10 mils thickness was formed on the pipe.

EXAMPLE 2

The conditions of Example 1 were again repeated except that a powdered thermoplastic polyester plastic material (Goodyear Tire and Rubber Co. VPE 777B), 100 mesh, was used as the coating material and the pipe was heated in the oven so that it had a temperature of about 525° F. during its passage through the cage. A polyester film of about 10 mils thickness was formed on the pipe.

EXAMPLE 3

A six inch wide continuous strip of uncured rubber inner tube was fed through a cage of the type shown in FIGS. 6–9 at a speed of 85 feet per minute. Two spray guns were mounted in the cage, one above and one below the strip, with their discharge heads spaced six inches from the strip. Talc suspended in air was sprayed from the guns at the rate of about 12 pounds of talc/hour/gun. The voltage at the power supply was approximately 90 kilovolts, and the voltage at the discharge ends of the guns was 60 kilovolts. This produced a talc coating on the strip having a thickness in the range of from one-eighth to one-half mil which prevented the uncured surfaces of the rubber from sticking together and served as a mold release agent when the rubber was placed in curing molds.

Although the coating materials to be used have generally been referred to as powders, it is to be understood that this invention is not limited thereto. As used herein, "powder" is intended to include any solid particles, organic or inorganic. For convenience, reference has been made herein to powder suspended in air. However, the powder may be suspended in gaseous mediums other than air, and "air" is intended to include other suitable gases.

We claim:

1. A method of coating an article with powder which comprises advancing said article along a path of movement through a treatment chamber, directing on to said article a plurality of spaced sprays of the coating powder from a plurality of spaced spray guns in said chamber, establishing an electrostatic charge on said sprayed powder, effecting deposition of said powder on the surface of said article with the assistance of an electrostatic field in the region between the spray guns and the article, and collecting undeposited powder in a receptacle in said chamber, fluidizing the powder in the receptacle with a gas, removing the fluidized powder from the receptacle and reusing the fluidized powder removed from the receptacle in said spaced spray guns.

2. A method in accordance with claim 1, and comprising feeding fluidized powder to said guns.

3. A method in accordance with claim 2, and comprising feeding said fluidized powder directly from the receptacle to said guns.

4. A method in accordance with claim 1, and comprising directing said sprays onto said article at angles regularly spaced around the path of the article.

5. A method in accordance with claim 4, and comprising directing said sprays at positions spaced along the length of said path.

6. A method in accordance with claim 1, and comprising heating said article to a temperature sufficient to raise the powder coating thereon to a temperature above its melting point temperature.

7. A method in accordance with claim 1 wherein said electrostatic field has an average voltage gradient of at least 5 kilovolts per inch.

8. In a method for coating an article with particles of a powder sprayed from a plurality of spray guns spaced longitudinally along the path of the article as the article advances through a treatment chamber comprising the steps of directing a gas-suspension of powder particles from the spray guns toward the article in the chamber, the aggregate spray of particles of powder of the spray guns substantially completely enveloping the article, collecting the powder particles which are not deposited on the article upon a gas-permeable floor in the chamber, supplying a gas to the floor to fluidize the powder collected on the floor, withdrawing the fluidized powder collected on the floor, and reusing the fluidized powder withdrawn from the floor in the spaced spray guns.

(References on following page)

References Cited

UNITED STATES PATENTS

| | | | |
|---|---|---|---|
| Re.253,362 | 3/1963 | Paton | 302—29 |
| 1,218,718 | 3/1917 | Throop | 118—326X |
| 1,983,180 | 12/1934 | McCarthy | 117—37 |
| 2,155,932 | 4/1939 | Davis | 156—4 |
| 2,219,283 | 10/1940 | Horn | 302—29 |
| 2,428,991 | 10/1947 | Ransburg | 117—93.4 |
| 2,546,701 | 3/1951 | Ransburg et al. | 118—629X |
| 2,584,695 | 2/1952 | Good | 118—625X |
| 2,723,054 | 11/1955 | Louden et al. | 222—195 |
| 2,758,389 | 8/1956 | Kelley | 34—242X |
| 2,777,782 | 1/1957 | Shetter et al. | 118—326X |
| 2,781,280 | 2/1957 | Miller | 239—3X |
| 2,981,225 | 4/1961 | Vatt et al. | 118—315X |
| 3,147,175 | 9/1964 | Gonzalez | 117—19X |
| 3,199,923 | 8/1965 | Brooks | 118—309 |
| 3,248,253 | 4/1966 | Barford et al. | 117—17 |
| 3,258,041 | 6/1966 | Lau | 302—29X |
| 3,268,264 | 8/1966 | Squires | 302—29 |
| 3,291,630 | 12/1966 | Deyle et al. | 118—312X |
| 3,318,725 | 5/1967 | Bryan | 118—315X |
| 3,323,934 | 6/1967 | Point | 117—17 |
| 3,327,948 | 6/1967 | Gignoux | 239—3 |
| 3,336,903 | 8/1967 | Point | 117—17X |
| 3,343,519 | 9/1967 | Chapman et al. | 118—314 |
| 3,377,183 | 4/1968 | Hurt et al. | 117—17 |
| 3,361,111 | 1/1968 | Strobel et al. | 118—309 |
| 3,425,396 | 2/1969 | Margola | 118—316 |

FOREIGN PATENTS

| | | |
|---|---|---|
| 1,333,795 | 6/1963 | France. |

WILLIAM D. MARTIN, Primary Examiner

E. J. CABIC, Assistant Examiner

U.S. Cl. X.R.

117—19; 302—29